United States Patent
Park et al.

(10) Patent No.: US 8,055,016 B2
(45) Date of Patent: Nov. 8, 2011

(54) APPARATUS AND METHOD FOR NORMALIZING FACE IMAGE USED FOR DETECTING DROWSY DRIVING

(75) Inventors: Sang-Cheol Park, Seoul (KR); Kwang-Soo Kim, Seoul (KR); Kyong-Ha Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1245 days.

(21) Appl. No.: 11/335,216

(22) Filed: Jan. 19, 2006

(65) Prior Publication Data

US 2006/0188130 A1 Aug. 24, 2006

(30) Foreign Application Priority Data

Jan. 20, 2005 (KR) .................. 10-2005-0005555

(51) Int. Cl.
*G06K 9/00* (2006.01)
*G08B 13/14* (2006.01)
(52) U.S. Cl. .................. 382/103; 382/118; 340/576
(58) Field of Classification Search .................. 340/575, 340/576, 573.1, 573.4, 691, 693, 436, 439, 340/937, 573.7; 382/117, 118, 203, 103, 382/789, 104; 351/206, 209, 246, 211, 221
See application file for complete search history.

(56) References Cited

U.S. PATENT DOCUMENTS

| | | | | |
|---|---|---|---|---|
| 5,689,241 A | * | 11/1997 | Clarke et al. | 340/575 |
| 5,786,765 A | * | 7/1998 | Kumakura et al. | 340/576 |
| 6,304,187 B1 | * | 10/2001 | Pirim | 340/576 |
| 6,661,345 B1 | * | 12/2003 | Bevan et al. | 340/575 |
| 6,756,903 B2 | * | 6/2004 | Omry et al. | 340/576 |
| 6,926,429 B2 | * | 8/2005 | Barlow et al. | 362/464 |
| 6,950,027 B2 | * | 9/2005 | Banas | 340/576 |
| 7,027,621 B1 | * | 4/2006 | Prokoski | 382/118 |
| 7,202,792 B2 | * | 4/2007 | Zhang et al. | 340/575 |

FOREIGN PATENT DOCUMENTS

JP 11048820 2/1999

OTHER PUBLICATIONS

Miyakawa, T., Takano, H., & Nakamura, K. (2004). Development of non-contact real-time blink detection system for doze alarm. Proceedings of SICE Annual Conference 2004 (pp. 1626-1631), Tokyo, Japan.*

(Continued)

*Primary Examiner* — Gregory M Desire
*Assistant Examiner* — Andrae S Allison
(74) *Attorney, Agent, or Firm* — The Farrell Law Firm, P.C.

(57) ABSTRACT

Disclosed are an apparatus and a method for normalizing an image of a driver's face in a predetermined size on the center of a monitor by automatically controlling a lens when the image of the driver's face is detected. The apparatus includes a lens for photographing a driver's face, a first motor for moving the lens in a forward or rearward direction in order to adjust a zoom parameter, a second motor for moving the lens in a horizontal or vertical direction in order to adjust a pan parameter or a tilt parameter, and a controller for extracting an initial face area from a photographed image and controlling operations of the first motor and the second motor according to the extracted initial face area.

18 Claims, 6 Drawing Sheets

OTHER PUBLICATIONS

Xu, G.; Sugimoto, T., "Rits Eye: a software-based system for real-time face detection and tracking using pan-tilt-zoom controllable camera," Pattern Recognition, 1998. Proceedings. Fourteenth International Conference on, vol. 2, no., pp. 1194-1197 vol. 2, Aug. 16-20, 1998.*

Preston et al, Spatially Dynamic Calibration of an Eye-Tracking System, IEEE Transactions on Systems, Man, and Cybernetics, vol. 23, No. 4, Jul./Aug. 1993.*

Ji et al, Real-Time Nonintrusive Monitoring and Prediction of Driver Fatigue, IEEE Transactions on Vehicular Technology, vol. 53, No. 4, Jul. 2004.*

* cited by examiner

APPARATUS AND METHOD FOR NORMALIZING FACE IMAGE USED FOR DETECTING DROWSY DRIVING

PRIORITY

This application claims priority to an application entitled "Apparatus and Method for Normalizing Face Image Used for Detecting Drowsy Driving" filed in the Korean Intellectual Property Office on Jan. 20, 2005 and assigned Serial No. 2005-5555, the contents of which are incorporated herein by reference.

BACKGROUND OF THE INVENTION

1. Field of the Invention

The present invention relates to an apparatus and a method for extracting a face image required for detecting drowsy driving, and more particularly to an apparatus and a method for controlling a lens so that an image of a driver's face can be normalized to a predetermined size in the center of a monitor.

2. Description of the Related Art

In order to detect drowsy driving, a procedure of extracting images of drivers' faces must be first performed. How this procedure is performed can substantially affect the overall performance of a conventional apparatus for detecting drowsy driving. However, since the drivers may assume various driving positions and postures (e.g., the drivers may sit upright, reclined, set-back, set-forward, slouched, etc.), it is difficult to accurately detect the images of the drivers' faces. In addition, since the drivers' faces have different sizes, detecting the images of the driver's face becomes more difficult.

Images of a driver's feature photographed by the conventional apparatus for detecting drowsy driving having a fixed camera are shown in FIGS. 1(a)-1(d).

Figure 1:
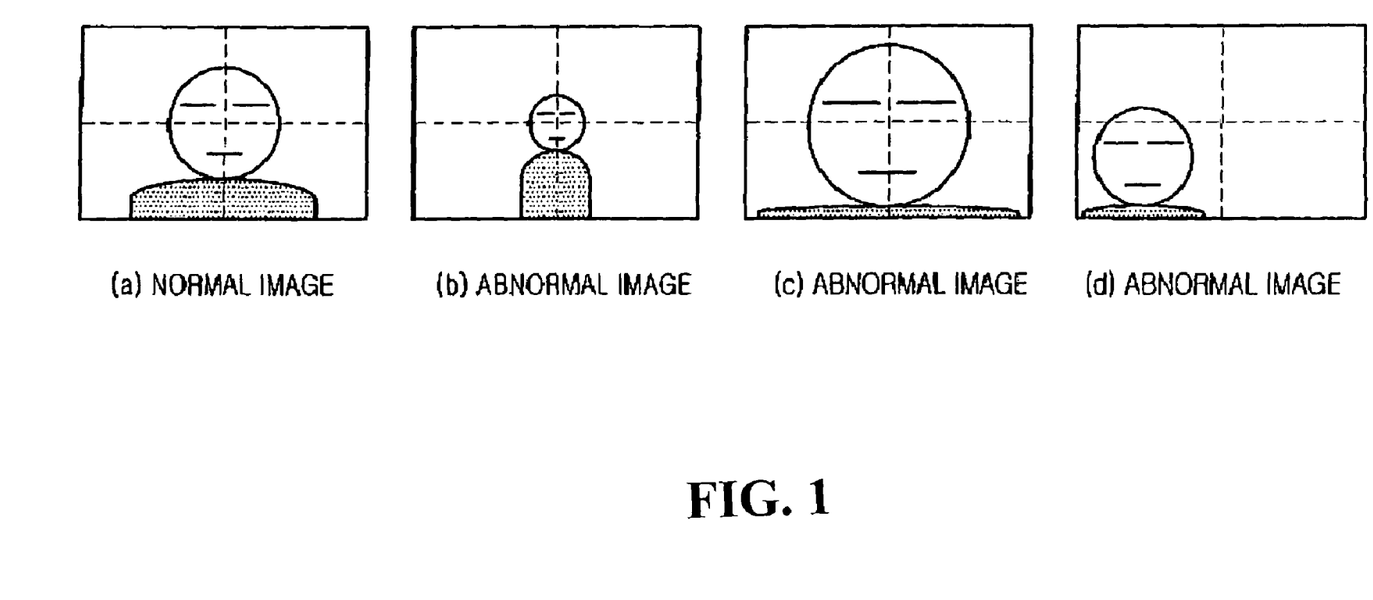
FIGS. 1(a) to 1(d) are images illustrating a driver's feature photographed by the conventional apparatus for detecting drowsy driving having a fixed camera.

FIG. 1(a) illustrates a normal image, and FIGS. 1(b) to 1(d) illustrates abnormal images; FIG. 1(b) illustrates a case where an image is abnormal because the driver's face is photographed as a very small image; FIG. 1(c) illustrates a case where an image is abnormal because the driver's face is photographed as a very large image; and FIG. 1(d) illustrates a case where the image is abnormal because the driver's face is photographed as an image excessively-offset to the left.

When the apparatus for detecting drowsy driving is initially installed, the position for mounting the camera must be determined according to individual drivers (and their driving habits) in such a manner that the abnormal images describe above are not obtained. Although the camera is suitably mounted, driving habits may change somewhat, and/or other drivers may drive the vehicle. However, it is difficult to control the position of the camera or perform re-calibration whenever a driver's driving habit changes somewhat, and/or other drivers drive the vehicle.

The problems are caused because the conventional apparatus for detecting drowsy driving extracts the image of the driver's face by employing a fixed camera.

In addition, the apparatus for detecting drowsy driving employing a fixed camera recognizes the distance between the camera and the driver as an average distance, and an operation of extracting an area corresponding to the image of the driver's face based on the photographed image is performed through software, which increases the time required to extract an image and reduces the system's efficiency.

In addition, if the image of the driver's face is intended to be extracted from an image using the fixed camera, a normalization procedure must be performed. Although the normalization procedure is performed, information about the resolution of an input face image is always changing. Herein, the normalization procedure is required because the face area in the photographed image may have a different position or a different size due to a difference in a face's position with respect to a camera lens according to the driver's driving position.

SUMMARY OF THE INVENTION

Accordingly, the present invention has been made to solve the above-mentioned problems occurring in the prior art, and an object of the present invention is to provide an apparatus and a method, which allow a driver's face to be positioned at the center of a photographed image in a predetermined size through the adjustment of a pan parameter, a tilt parameter, or a zoom parameter, thereby enhancing the performance and the speed for extracting the image of the driver's face and detecting drowsy driving.

To accomplish the above objects, there is provided an apparatus for extracting and normalizing a face image to detect drowsy driving, the apparatus including a lens for photographing a driver's face, a first motor for moving the lens in a forward or rearward direction in order to adjust a zoom parameter, a second motor for moving the lens in a horizontal or vertical direction in order to adjust a pan parameter and/or a tilt parameter, and a controller for extracting an initial face area from a photographed image and controlling operations of the first motor and the second motor according to the extracted initial face area.

According to another aspect of the present invention, there is provided a method for normalizing face image extraction in an apparatus for extracting the face image used for detecting drowsy driving, which includes a lens enabling pan, tilt, and/or zoom parameter adjustment, the method including the steps of extracting an initial face area from an input image, calculating face elements based on the extracted initial face area, determining if adjustment of a pan parameter, a tilt parameter, and/or a zoom parameter is required by analyzing results of the calculated face elements, and obtaining a normalized face image by adjusting the pan parameter, the tilt parameter, and/or the zoom parameter according to the determination result.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. Although many specific items, such as detailed pixel numbers, detailed input images, etc., are shown in the following description, these are provided for the purpose of overall comprehension about the present invention. Therefore, it is generally known to those skilled in the art that the present invention can be embodied without being limited by these specific items. In the following description of the present invention, a detailed description of known functions and configurations incorporated herein will be omitted when it may make the subject matter of the present invention unclear.

Figure 2:
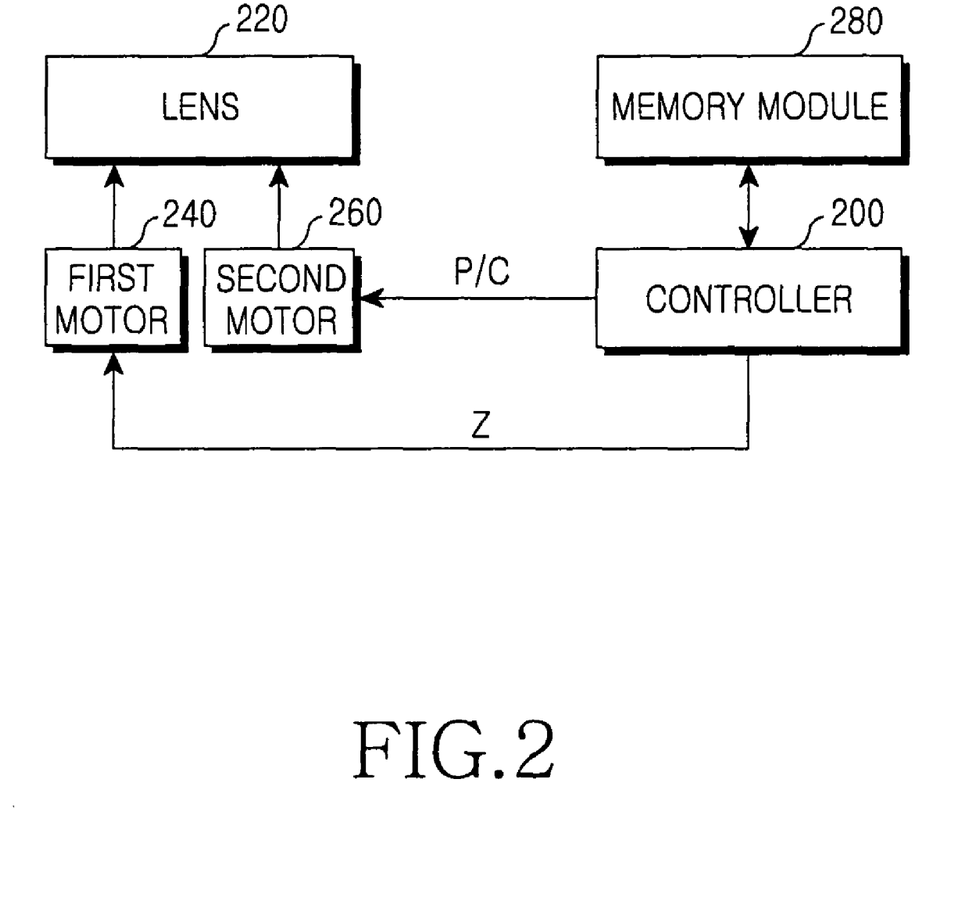
FIG. 2 is a block diagram illustrating an apparatus for extracting and normalizing a face image used for detecting drowsy driving according to a preferred embodiment of the present invention.

FIG. 2 is a block diagram illustrating an apparatus for extracting and normalizing a face image used for detecting drowsy driving according to a preferred embodiment of the present invention.

A lens module 220 is used for photographing a subject (a driver's face). A first motor 240 is used for moving the lens module 220 in a forward or rearward direction in order to adjust a zoom parameter. A second motor 260 is used for moving the lens module 220 in a horizontal direction or in a vertical direction in order to adjust a pan parameter or a tilt parameter. A memory module 280 is used for storing a program for detecting drowsy driving, frontal face templates, and a look-up table. A controller 200 is used for controlling the driving of the first motor and the second motor 240 and 260, respectively, depending on the look-up table. A reference numeral Z represents zoom parameter adjustment control, and a reference numeral P/C represents pan or tilt parameter adjustment control.

Figure 3:
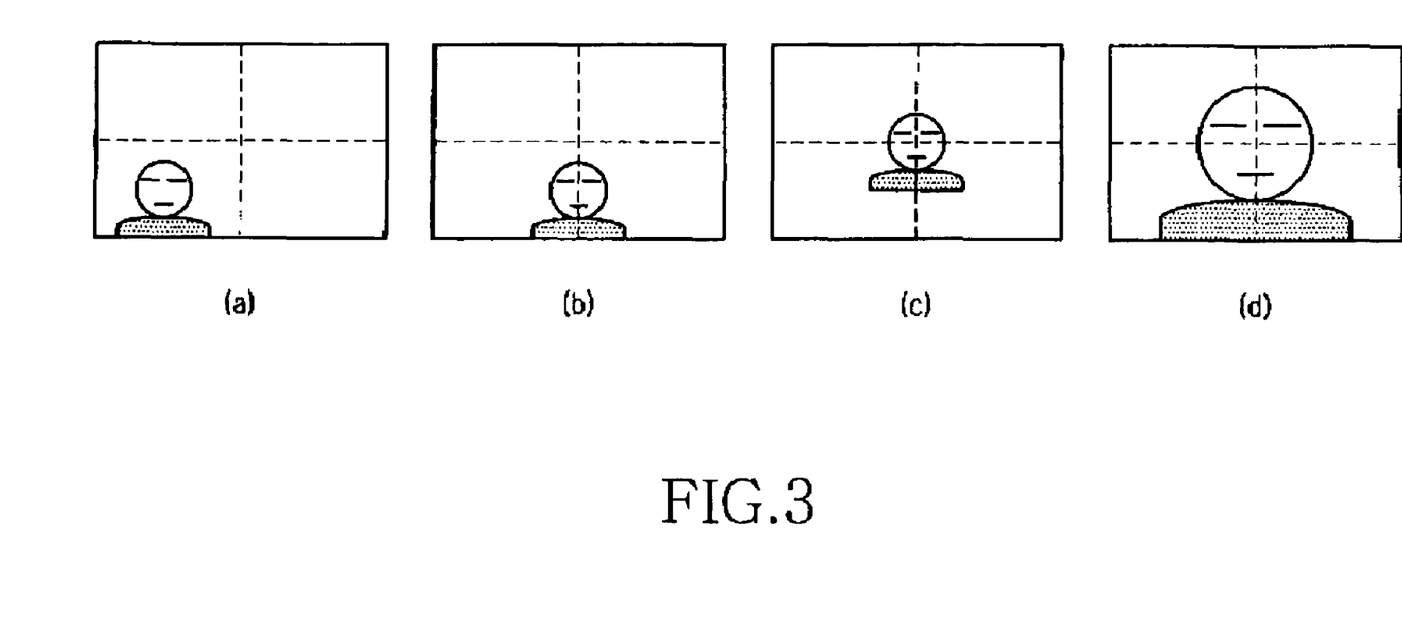
FIGS. 3(a) to 3(d) are images illustrating a method for extracting and normalizing a face image used for detecting drowsy driving according to a preferred embodiment of the present invention.

FIGS. 3(*a*) to 3(*d*) are sample images for illustrating a method for extracting and normalizing a face image used for detecting drowsy driving according to the present invention.

FIG. 3(*a*) illustrates an input image, and the image is an abnormal image because a driver's face in the image is small and is offset to the left lower part of the image.

FIG. 3(*b*) illustrates an image obtained by performing pan parameter adjustment with respect to the input image shown in FIG. 3(*a*), and the obtained image is an abnormal image because the driver's face in the image is undesirably small and is offset to the left lower part of the image.

FIG. 3(*c*) illustrates an image obtained by performing tilt parameter adjustment with respect to the image shown in FIG. 3(*b*). Note this image is still an abnormal image because the driver's face in the image is still small.

FIG. 3(*d*) illustrates an image obtained by performing zoom parameter adjustment with respect to the image shown in FIG. 3(*c*), and the image is now a normal image.

Figure 4:
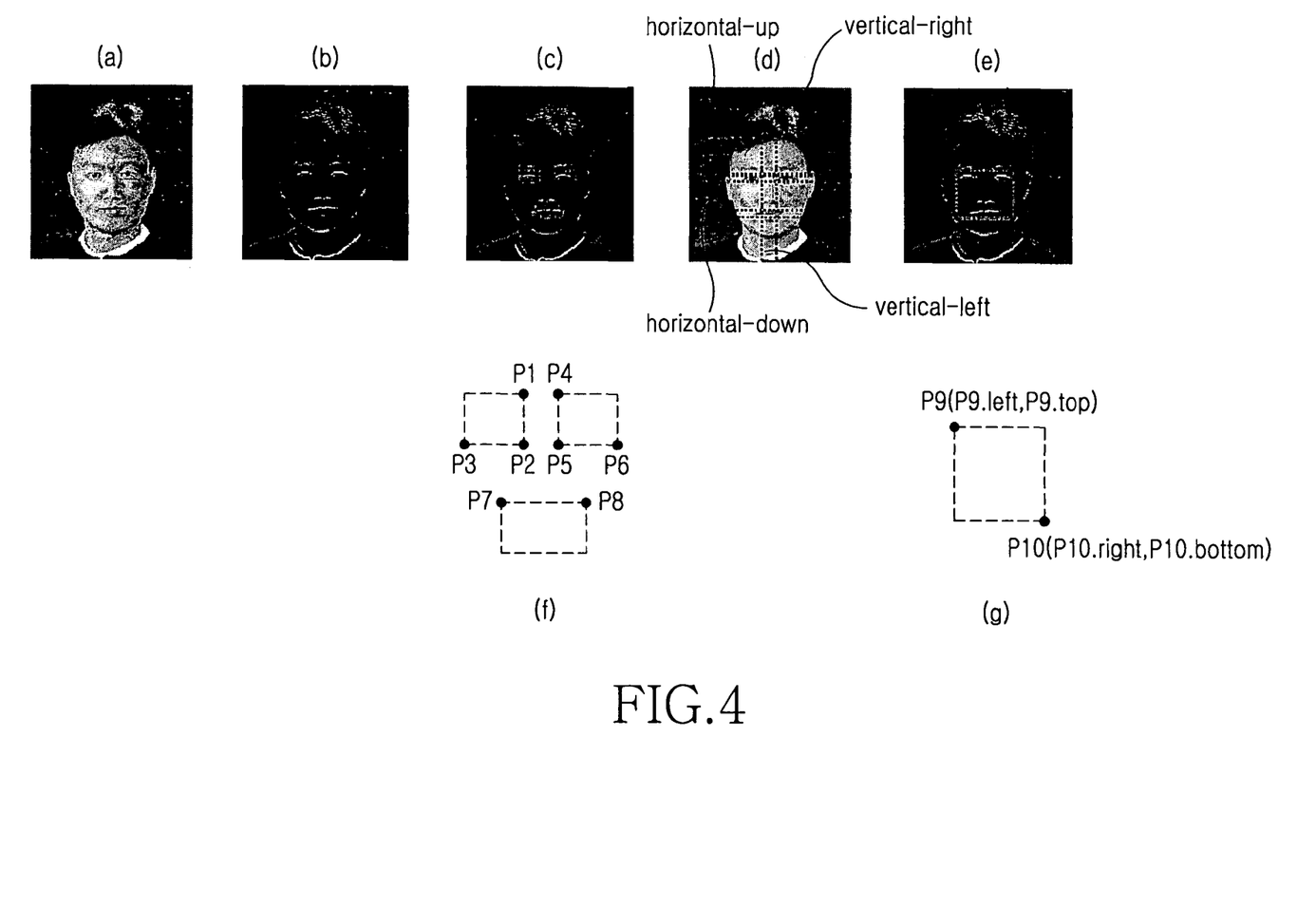
FIGS. 4(a) to (g) illustrate examples of images for explaining a procedure of calculating a face element in a procedure of extracting and normalizing a face image used for detecting drowsy driving in detail according to a preferred embodiment of the present invention.

FIGS. 4(*a*) to 5(*g*) illustrate examples of images for describing a procedure of calculating a face element in a procedure of extracting and normalizing a face image used for detecting drowsy driving in detail according to the present invention.

FIG. 4(*a*) illustrates an input image; FIG. 4(*b*) illustrates an image obtained by extracting a horizontal edge from the input image shown in FIG. 4(*a*); FIG. 4(*c*) illustrates an image obtained by extracting eye areas and a mouth area from the image shown in FIG. 4(*b*); FIG. 4(*d*) illustrates an image obtained by extracting main horizontal lines and main vertical lines from the image shown in FIG. 4(*c*); FIG. 4(*e*) illustrates an image obtained by extracting a main face area from the image shown in FIG. 4(*d*); FIG. 4(*f*) illustrates main coordinates of the eye areas and the mouth area required for extracting the main horizontal lines and the main vertical lines of FIG. 4(*d*) and FIG. 4(*g*) illustrates two coordinates required for extracting a main area.

Figure 5:
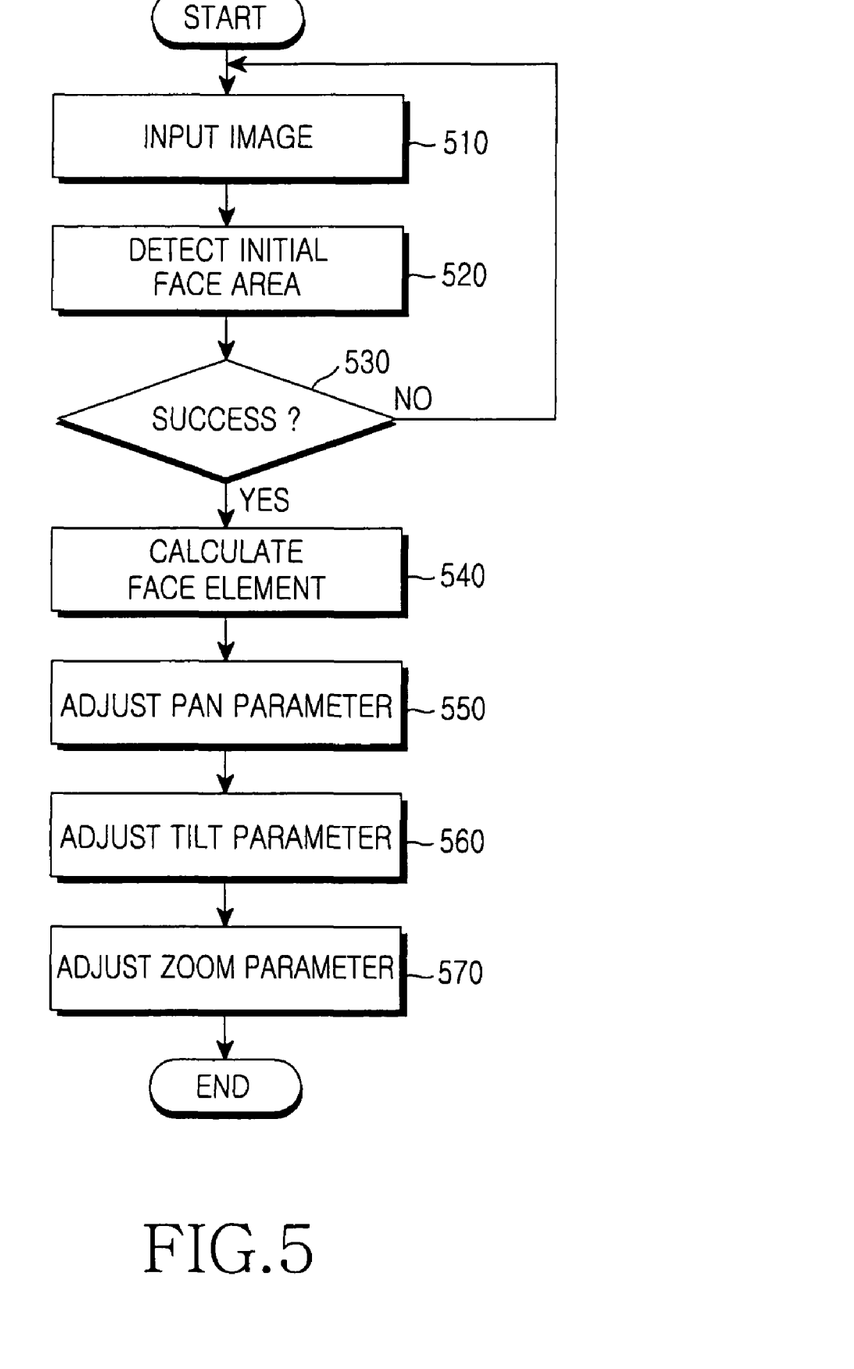
FIG. 5 is a flowchart illustrating a method for extracting and normalizing a face image used for detecting drowsy driving according to a preferred embodiment of the present invention.

FIG. 5 is a flowchart illustrating a method for extracting and normalizing a face image used for detecting drowsy driving according to the present invention.

In order to stably extract an image area of a driver's face in a vehicle and then extract an eye area based on an extracted face area, the face area must be detected on an exact position and in a suitable size. If the face area is extracted as a very small area, the extraction information about the eye area is inaccurate. If the face area is extracted as very large area, the sight of the eye area is lost when the driver's face moves, so that the extraction of the eye area can fail. In addition, if the face is excessively offset to the left or the right in an image, it is difficult to stably extract the face area. However, if pan, tilt, or zoom parameter adjustment is performed by automatically moving the lens as described later, the image of the driver's face may be stably extracted.

In step 510, an image is input into the apparatus in an initial state. The initial state denotes a state, in which the driver's face is photographed in a vehicle by photographing a subject in a large size (e.g., close-up) using a zoom parameter of the lens.

In step 520, the apparatus for extracting and normalizing a face image used for detecting drowsy driving extracts an initial face area from the received image. In order to conveniently and quickly perform a calculation of the initial face area, a face candidate area is searched according to whether the image matches with a low resolution frontal face templates.

In step 530, it is determined if the extraction of the initial face area is successively achieved. In other words, it is determined if the face candidate area is a face image. For example, the face candidate area is matched to an original resolution frontal face template. Alternatively, if the initial face area is not found, a procedure for extracting and normalizing a face image returns to the initial state in step 510. In contrast, if the initial face area is successively found, the apparatus for extracting and normalizing a face image returns to step 540 so as to perform a face element calculation of calculating feature elements for the initial face area.

Figure 6:
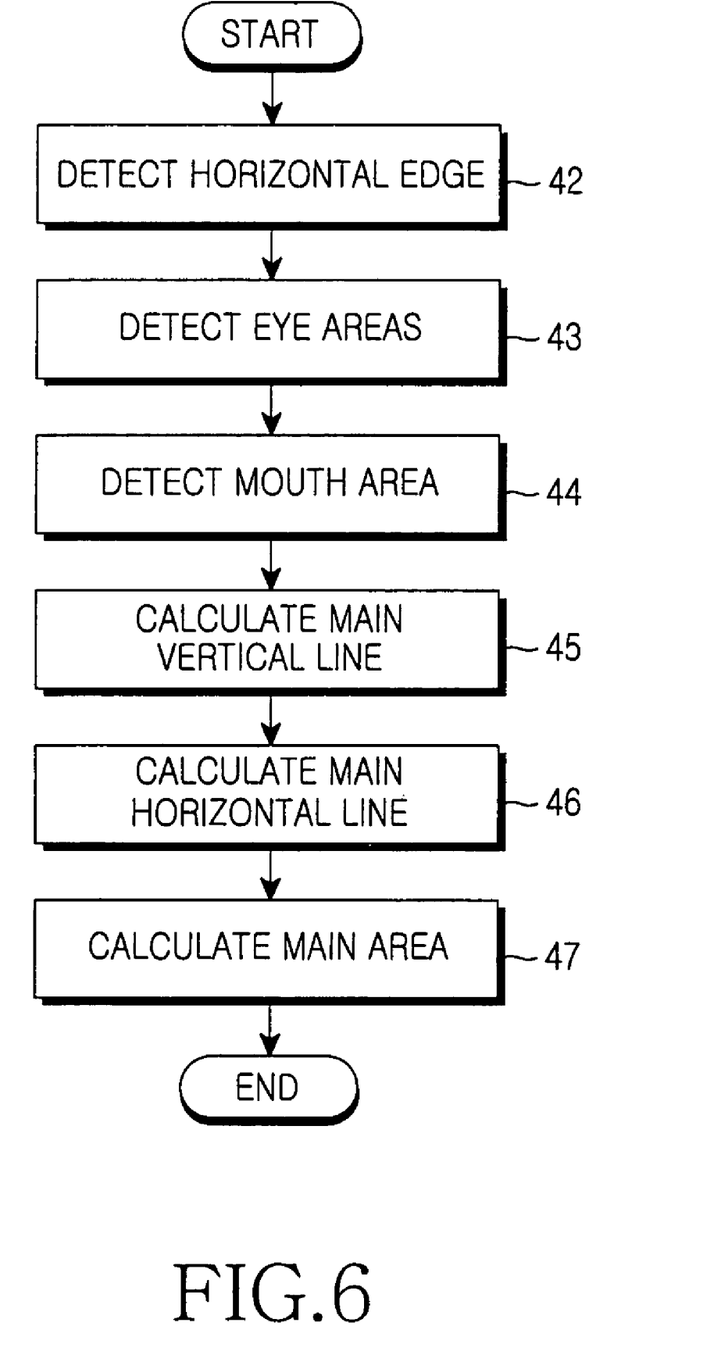
FIG. 6 is a flowchart illustrating a procedure of calculating a face element in detail.

FIG. 6 is a flowchart illustrating the face element calculation of FIG. 5 in detail.

In step 42, a horizontal edge is extracted in order to detect an eye area and a mouth area from the face area (the initial area having been previously extracted in step 520 of FIG. 5). For example, the extracted horizontal edge may be the horizontal edge marked in the image shown in FIG. 4(*b*). Such a horizontal edge may be extracted using a Sobel edge calculation scheme, which is well known in the art, or a template matching scheme.

In step 43, in order to extract the eye area, a horizontal edge image is extracted. Horizontal edges of several lines shown under edges of an eyebrow area are recognized as the eye area. In this case, the extracted area is constructed in the optimal square shape. The eye area may be extracted through a histogram analysis or the template matching scheme.

In step 44, in order to extract the mouth area, a horizontal edge image is extracted. The mouth area may be extracted based on the horizontal edges shown under edges of a nose area in the center of the face image. In this case, the extracted area is constructed in the optimal square shape. The mouth area may be detected through a histogram analysis or the template matching scheme.

In step 45, the main vertical lines are calculated. The main vertical lines are calculated on the assumption that the received image has 2-dimensional coordinates, and the most left of the upper part of the received image is a reference point (0,0). Referring to FIG. 4(*d*), the main vertical lines correspond to a left vertical line (vertical_left) and a right vertical line (vertical_right). Referring to FIG. 4(*f*), the left vertical line (vertical_left) may be defined using a coordinate value for a right point (e.g., see P1 or P2 of FIG. 4(*f*)) of a left eye area, and the right vertical line (vertical-right) may be defined using a coordinate value for a left point (e.g., see P4 or P5 of FIG. 4(*f*)) of a right eye area.

In step 46, the main horizontal lines are calculated. The main horizontal lines are calculated using coordinates of the eye areas and the mouth area. The main horizontal lines correspond to an upper horizontal line (horizontal_up) and a lower horizontal line (horizontal_down). Referring to FIG. 4(*f*), the upper horizontal line (horizontal_up) may be defined using coordinate values for a lower point (P2, P3, P5, or P6) of the eye areas, and the lower horizontal line (horizontal_down) may be defined using coordinate values for an upper point (P7 or P8) of the mouth area.

In step 47, the main area is calculated. The main area is obtained in the form of a minimum outline square including the eye areas and the mouth area. The main area is shown in FIG. 4(*e*). As shown in FIG. 4(*g*), the main area may be expressed as two points. The point P9 and the point P10 express a square as the left-upper point and the right-lower point, respectively. A coordinate value P9.left represents the smaller value among an x coordinate value of a left eye area and an x coordinate value of a left part of the mouth area. A coordinate value P9.top represents the smaller value among a y coordinate value of a left eye area and a y coordinate value of a right eye area. A coordinate value P10.right represents the larger value among an x coordinate value of a right eye area and an x coordinate value of a right part of the mouth area. A coordinate value P10.bottom represents a y coordinate value of the mouth area.

The main horizontal/vertical lines formed as described above may be used for adjusting a pan/tilt parameter, and the main area information may be used for calculating a zoom parameter.

Referring back to FIG. 5, in step 550, the pan parameter is adjusted. For example, the pan parameter adjustment is used for converting the image shown in FIG. 3(*a*) into the image shown in FIG. 3(*b*).

Since the pan parameter information is information varying in a horizontal direction in an image, main vertical components are used. In other words, in a QVGA (Quarter Video Graphic Array) image having 320×240 pixels, a horizontal component corresponds to 320, and the center value corresponds to 160. Since main vertical lines define the interval between two eyes, the pan parameter value is adjusted in such a manner that the center value of the interval between the two eyes becomes the pixel value of 160.

On the assumption that the center value of x coordinates values is "meanx", the pan parameter is adjusted in such a manner that the following equation is satisfied.

$$\text{vertical\_left} < \text{meanx} < \text{vertical\_right}$$

In order to adjust parameters, operation angles of motors for adjusting the lens are adjusted according to the movement of a predetermined pixel in an image. Motor values may be previously defined through the look-up table.

In step 560, the tilt parameter is adjusted. For example, the tilt parameter adjustment is used for converting the image shown in FIG. 3(*b*) into the image shown in FIG. 3(*c*).

In other words, in a QVGA image having 320×240 pixels, a vertical component corresponds to 240, and the center value of the vertical component corresponds to 120. Since main horizontal lines are formed by an upper line and a lower line, the tilt parameter value is adjusted in such a manner that the center value of the upper line and the lower line becomes the pixel value of 120.

On the assumption that the center value of y coordinate values is "meany", the tilt parameter is adjusted in such a manner that the following equation is satisfied.

$$\text{horizontal\_top} < \text{meany} < \text{horizontal\_down}$$

The look-up table is used as in the pan parameter adjusting scheme. If the adjustment of the tilt parameter is finished, the zoom parameter is adjusted in step 570. For example, the zoom parameter adjustment is used for converting the image shown in FIG. 3(*c*) into the image shown in FIG. 3(*d*).

The face image is previously positioned at the center of the received image through the pan/tilt parameter adjustment, and then, the eyes of the face image may be stably extracted. However, the zoom parameter adjustment is required such that a driver's face can be stably extracted even when the driver is drowsy or moves somewhat. The size of the main area in the received image is calculated in such a manner that the size of the main area is within the range of reference values. Herein, the reference values may be determined by a user. On the assumption that the size of the main area corresponds to n×m=nm pixels, the zoom parameter is adjusted in such a manner that the following equation is satisfied. Herein, the Min and Max are the reference values used for determining the range of the size of the main area.

$$\text{Min} < \text{nm} < \text{Max}$$

Although it may vary depending on characteristics of cameras, if a face image photographed by a camera for detecting drowsy driving has at least 64×64 pixels, the size of the main area should be at least 4,096 pixels. However, on the assumption that the allowance corresponds to 100 pixels, the size of the main area may have a value within the range of 3,996 pixels to 4,196 pixels. Accordingly, if the size of the extracted main area does not correspond to the value within the range of 3,996 pixels to 4,196 pixels, the zoom parameter is adjusted in such a manner that the size of the extracted main area corresponds to the value within the range of 3,996 pixels to 4,196 pixels.

Although all parameters of pan, tilt, and zoom parameters are adjusted as shown in FIGS. 3 to 5 according to an embodiment of the present invention, parameters necessary to be adjusted among the pan, tilt, and zoom parameters are first determined by analyzing the result of the face element calculation, and then only the determined parameters may be adjusted.

As described above, according to the present invention, a face image is normalized in such a manner that the face image is extracted in a predetermined size and on a predetermined position regardless of the size of a driver's face and a driver's driving habit. Accordingly, it is possible to exactly extract a face image used for detecting drowsy driving.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. An apparatus for extracting and normalizing a face image to detect a driver's state of alertness, the apparatus comprising:
    a lens for photographing a driver's face;
    a first motor for moving the lens in a forward or rearward direction in order to adjust a zoom parameter;
    a second motor for moving the lens in a horizontal or vertical direction in order to adjust a pan parameter or a tilt parameter; and
    a controller for extracting an initial face area from a photographed driver's face image which is an input image and controlling operations of the first motor and the second motor if normalization of the face image is required by analyzing the extracted initial face area, wherein the pan parameter is adjusted by controlling movement of the lens with the second motor until a central x coordinate is positioned between two main vertical lines of the initial face area.

2. The apparatus as claimed in claim 1, further comprising a memory storing frontal face templates used for extracting the initial face image area through matching in the input image.

3. The apparatus as claimed in claim 1, further comprising a memory for storing a look-up table having a zoom parameter adjustment value used to control the first motor and a pan parameter adjustment value and a tilt parameter adjustment value used to control the second motor.

4. The apparatus as claimed in claim 1, wherein at least one of a pan parameter adjustment, a tilt parameter adjustment, and a zoom parameter adjustment is based on a result of face element calculation, the face element calculation being performed by extracting a horizontal edge from the initial face area extracted from the input image, extracting eye areas and a mouth area, calculating main vertical lines and main horizontal lines, and thereafter calculating a main area.

5. The apparatus as claimed in claim 4, wherein the main vertical lines are determined using coordinate values of at least one right most point in a left eye area of the initial face area and coordinate values of at least one left most point in a right eye area of the initial face area.

6. The apparatus as claimed in claim 4, wherein the main area is determined as a minimum outline square including the eye areas and the mouth area.

7. The apparatus as claimed in claim 6, wherein the main area is defined by means of a first point and a second point, an x coordinate value of the first point is a smaller value selected from between an x coordinate value of a left eye area and an x coordinate value of a left part of the mouth area, a y coordinate value of the first point is a smaller value selected from between a y coordinate value of the left eye area and a y coordinate value of a right eye area, an x coordinate value of the second point is a larger value selected from between an x coordinate value of the right eye area and an x coordinate value of a right part of the mouth area, and a y coordinate value of the second point is a y coordinate value of the mouth area.

8. The apparatus as claimed in claim 1, wherein the tilt parameter adjustment is achieved by controlling movement of the lens with the second motor until a central y coordinate is positioned between two main horizontal lines of the initial face area.

9. The apparatus as claimed in claim 4, wherein the main horizontal lines are determined using coordinate values of lower points in eye areas of the initial face area and coordinate values of upper points in a mouth area of the initial face area.

10. The apparatus as claimed in claim 1, wherein at least one of the pan parameter adjustment, the tilt parameter adjustment, and the zoom parameter adjustment is based on a result of a face element calculation performed by extracting a horizontal edge from the initial face area extracted from the input image, extracting eye areas and a mouth area, and then calculating a main area, the pan parameter adjustment is performed by controlling the second motor such that a center value of x coordinate values in the initial face area is positioned between coordinate values of at least one right point in a left eye area and coordinate values of at least one left point in a right eye area, and the tilt parameter adjustment is performed by controlling the second motor such that a center value of y coordinate values in the initial face area is between coordinate values of at least one lower point in the eye areas and coordinate values of at least one upper point in the mouth area.

11. A method for normalizing face image extraction in an apparatus for extracting the face image used for detecting a driver's state of alertness, which includes a camera having lens enabling pan, tilt, and zoom parameter adjustment, the method comprising the steps of:
    extracting an initial face area from an input image, via a controller of the apparatus;
    calculating face elements based on the extracted initial face area, via the controller of the apparatus;
    determining if adjustment of a pan parameter, a tilt parameter, and a zoom parameter are required by analyzing results of the calculated face elements, via the controller of the apparatus; and
    obtaining a normalized face image by adjusting at least one of the pan parameter, the tilt parameter, and the zoom parameter according to the determination result, wherein the pan parameter is adjusted by controlling movement of the lens in a predetermined direction until a central x coordinate is positioned between two main vertical lines of the initial face area.

12. The method as claimed in claim 11, wherein, in the step of calculating the face elements includes:
    extracting a horizontal edge from an initial face image extracted from the input image;
    extracting eye areas and a mouth area from a result of the extracted horizontal edge;
    calculating main vertical lines and main horizontal lines based on the extracted eye areas and the extracted mouth area; and
    calculating a main area.

13. The method as claimed in claim 12, wherein the main vertical lines are determined using coordinate values of at least one right point in a left eye area of the initial face area and coordinate values of at least one left point in a right eye area of the initial face area.

14. The method as claimed in claim 12, wherein the main horizontal lines are determined using coordinate values of at least one lower point in each of the eye areas of the initial face area and coordinate values of at least one upper point in the mouth area of the initial face area.

15. The method as claimed in claim 11, wherein the tilt parameter adjustment is achieved by controlling the lens in a predetermined direction until a central y coordinate is positioned between two main horizontal lines of the initial face area.

16. The method as claimed in claim 11, wherein at least one of the pan parameter adjustment, the tilt parameter adjustment, and the zoom parameter adjustment is based on a result of a face element calculation performed by extracting a horizontal edge from the initial face area extracted from the input image, extracting eye areas and a mouth area, and then calculating a main area based on the eye areas and the mouth area, the pan parameter adjustment is performed by controlling the second motor such that a center value of x coordinate values in the initial face area is positioned between coordinate values of at least one right point in a left eye area and coordinate values of at least one left point in a right eye area, and the tilt parameter adjustment is performed by controlling the second motor such that a center value of y coordinate values in the initial face area is between coordinate values of at least one lower point in the eye areas and coordinate values of at least one upper point in the mouth area.

17. The method as claimed in claim 11, wherein the main area is determined as a minimum outline square including the eye areas and the mouth area.

18. The method as claimed in claim 17, wherein the main area is defined by a first point and a second point, an x coordinate value of the first point is a smaller value selected from between an x coordinate value ola left eye area and an x coordinate value of a left part of the mouth area, a y coordinate value of the first point is a smaller value selected from between a y coordinate value of the left eye area and a y coordinate value of a right eye area, an x coordinate value of the second point is a larger value selected from between an x coordinate value of the right eye area and an x coordinate value of a right part of the mouth area, and a y coordinate value of the second point has a y coordinate value of the mouth area.

* * * * *